(12) United States Patent
Rajakarunanayake

(10) Patent No.: US 7,908,624 B2
(45) Date of Patent: Mar. 15, 2011

(54) SYSTEM AND METHOD FOR JUST IN TIME STREAMING OF DIGITAL PROGRAMS FOR NETWORK RECORDING AND RELAYING OVER INTERNET PROTOCOL NETWORK

(75) Inventor: Yasantha Nirmal Rajakarunanayake, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 448 days.

(21) Appl. No.: 11/820,102

(22) Filed: Jun. 18, 2007

(65) Prior Publication Data

US 2008/0313687 A1  Dec. 18, 2008

(51) Int. Cl.
*H04N 7/18* (2006.01)
*H04N 7/173* (2011.01)
*H04L 12/28* (2006.01)
*H04L 12/56* (2006.01)

(52) U.S. Cl. ........... 725/80; 725/116; 725/133; 370/392
(58) Field of Classification Search .................. None
See application file for complete search history.

(56) References Cited

U.S. PATENT DOCUMENTS

| | | | |
|---|---|---|---|
| 5,872,777 A | 2/1999 | Brailean et al. | |
| 5,915,094 A | 6/1999 | Kouloheris et al. | |
| 6,674,731 B1 * | 1/2004 | Bradshaw et al. | 370/316 |
| 6,947,430 B2 | 9/2005 | Bilic et al. | |
| 6,965,941 B2 | 11/2005 | Boucher et al. | |
| 7,000,024 B1 | 2/2006 | Champagne et al. | |
| 7,009,967 B1 | 3/2006 | Hariharasubrahmanian | |
| 7,047,273 B2 | 5/2006 | Kamentsky et al. | |
| 7,315,898 B2 * | 1/2008 | Kohno | 709/230 |
| 7,430,617 B2 | 9/2008 | Walsh et al. | |
| 7,773,546 B2 | 8/2010 | Rajakarunanayake et al. | |
| 2002/0095519 A1 | 7/2002 | Philbrick et al. | |
| 2003/0145101 A1 | 7/2003 | Mitchell et al. | |
| 2004/0062245 A1 | 4/2004 | Sharp et al. | |
| 2005/0055720 A1 | 3/2005 | Atad et al. | |
| 2006/0080707 A1 * | 4/2006 | Laksono | 725/38 |
| 2006/0174287 A1 * | 8/2006 | Maeda | 725/80 |
| 2006/0182025 A1 | 8/2006 | Kim et al. | |
| 2006/0282855 A1 * | 12/2006 | Margulis | 725/43 |
| 2007/0240191 A1 * | 10/2007 | Singh et al. | 725/81 |
| 2008/0117911 A1 | 5/2008 | Rajakarunanayake et al. | |
| 2008/0198781 A1 | 8/2008 | Rajakarunanayake et al. | |

OTHER PUBLICATIONS

U.S. Appl. No. 11/708,439 Final Office Action mailed Nov. 2, 2010, 19 pages.
Non-Final Office Action received for U.S. Appl. No. 11/717,326, mailed on Aug. 3, 2009, 17 pages.
U.S. Appl. No. 11/717,326, Notice of Allowance mailed Apr. 7, 2010, 17 pages.

* cited by examiner

*Primary Examiner* — John W Miller
*Assistant Examiner* — Chris Parry
(74) *Attorney, Agent, or Firm* — Brake Hughes Bellermann LLP

(57) ABSTRACT

A settop box for streaming a television program to a network device through a network includes a central processing unit, a network interface device, a direct memory access engine, a buffer, and a memory for storing computer-executable instructions. The stored instructions cause the direct memory access engine to route time-ordered digital media data packets encoding the television program into the buffer, cause the central processing unit to add a network header to the digital media data packets, and cause the network interface device to relay the digital media data packets to a network device through the network, wherein the packets are relayed substantially without latency and with a time-ordering based on the same time-ordering of the packets in the buffer.

19 Claims, 6 Drawing Sheets

US 7,908,624 B2

SYSTEM AND METHOD FOR JUST IN TIME STREAMING OF DIGITAL PROGRAMS FOR NETWORK RECORDING AND RELAYING OVER INTERNET PROTOCOL NETWORK

This description relates to streaming of digital media and, in particular, to a system and method for just in time streaming (JITS) of digital media programs and for network recording and relaying over internet protocol (IP) networks.

BACKGROUND

As Internet based broadband systems have become widely deployed, the display of high-quality streaming media (e.g., television signals) delivered through Internet protocol ("IP") based networks has been contemplated. Many vendors seek both to display media as well as to stream digital media in various customer premises, including digitally connected homes. However, because of the high bandwidth and processing power required to deliver and display digital video, it is quite challenging to provide high quality IP-based television ("IPTV") functionality using traditional settop box ("STB") capabilities.

Moreover, homes can be equipped with multiple STBs to provide for the rendering of television programs at multiple locations within the home (e.g., living room, kitchen, various bedrooms). However, streaming television programs from a STB to network connected storage or playback device can be computationally-intensive and therefore expensive.

SUMMARY

Accordingly, digital settop boxes for streaming television programs received from a satellite connection to recording or playback devices connected to the settop box through a network are disclosed, in which the television programs are streamed through the settop box to the record and playback devices as the programs are received. Because the programs are streamed as they are received, a time stamp does not have to be generated and appended to the streamed data. Rather, timing of the streamed data and be based on the timing of the data as they are received by the settop box. Therefore, processing resources are conserved as the television program is streamed out of the settop box.

In a first general aspect, a method includes receiving a television broadcast that includes at least one television program at a first settop box. Time-ordered digital media data packets encoding the at least one program into a buffer are received, and a network header is added to the digital media data packets. The digital media data packets are relayed to a network device connected to the first settop box through a network, and the packets are relayed substantially without latency and with a time-ordering based on the same time-ordering of the packets in the buffer. Acknowledgment packets are received from the network device acknowledging the reception of the relayed digital media data packets, and space is freed in the buffer that was used to buffer for the acknowledged data packets.

In another general aspect, a settop box for streaming a television program to a network device through a network includes a central processing unit, a network interface device, a direct memory access engine, a buffer, and a memory for storing computer-executable instructions. The stored instructions cause the direct memory access engine to route time-ordered digital media data packets encoding the television program into the buffer, cause the central processing unit to add a network header to the digital media data packets, and cause the network interface device to relay the digital media data packets to a network device through the network, wherein the packets are relayed substantially without latency and with a time-ordering based on the same time-ordering of the packets in the buffer.

The details of one or more implementations are set forth in the accompanying drawings and the description below. Other features will be apparent from the description and drawings, and from the claims.

DETAILED DESCRIPTION

Figure 1:
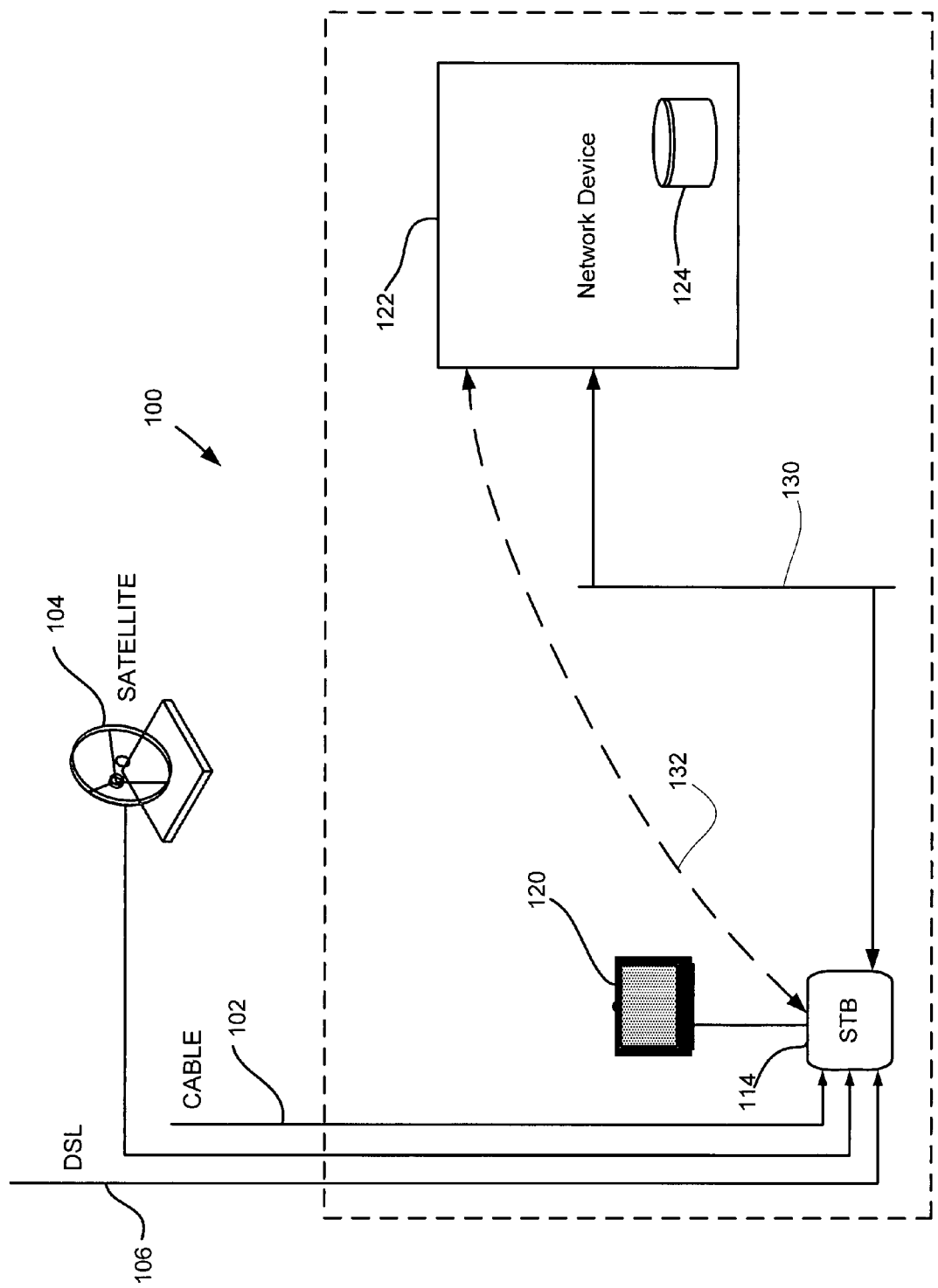
FIG. 1 is a block diagram of a local area network for recording and playing back television programs on a variety of devices connected to the network.

FIG. 1 is a block diagram of a local area network (LAN) 100 for recording and playing back television programs on a variety of devices connected to the network. Television broadcasts can be received from one or more broadcasters that broadcast signals that encode television programs. For example, an affiliate of a television network (e.g., ABC, NBC, CBS, FOX) can broadcast a television program on a very high frequency (VHF) channel or on an ultra high frequency (UHF) channel, and the broadcast can be received by the LAN 100 for playback. A television broadcaster also can broadcast multiple signals for encoding multiple televisions programs. For example, a cable television provider can broadcast multiple television programs over a cable 102 that is routed to the LAN 100, so that one or more programs can be selected from the broadcast for viewing or recording on a device connected to the LAN. Other broadcast mechanisms are also possible. For example, multiple television programs can be broadcast over a satellite connection 104 to the LAN 100. In another example, multiple television programs can be broadcast over a high-speed Internet connection (e.g., a digital subscriber line (DSL) connection 106 to the LAN 100. Thus, the television program can be received from a variety of signal sources, including, for example, a satellite dish, a coaxial, cable, a telephone line (including DSL connections), a broadband over power line connection, an IP Network, or a VHF or UHF antenna.

When a television broadcast is received at the LAN 100, a television program carried by the broadcast signal can be routed to a STB 114 that is connected to a television display device 120. Generally, the STB 114 routes television programs and digital signals that encode the television program. If the television broadcast is an analog broadcast (e.g., a VHF or UHF broadcast), an analog to digital converter in the STB can convert the incoming analog signal into an outgoing digital signal. The digital signals can be encoded and compressed before transmission and storage. The television display device 120 can be any display device for rendering a television program to a viewer, for example, a traditional cathode ray tube (CRT) based television set or a flat panel plasma or liquid crystal display (LCD) based device. The display device normally associated with a personal computer (e.g., a computer monitor) can also be used as a television display device. The STB 114 can include electronic tuner circuitry adapted for demultiplexing a television program from the television broadcast received by the LAN 100, so that the program can be rendered on the display device associated with the STB. The STB can be a built-in component of the display device (e.g., in the case of a "cable ready" television set, or DTV), or the STB can be an external device that is connected to the display device by one or more wires. For example, special external digital STB's can receive a digital television broadcast and decode the broadcast for a television set that does not have a built-in digital tuner. In the case of direct broadcast satellite (mini-dish) systems, such as those offered by SES Astra, Dish Network, and DirecTV, the STB can be an integrated receiver/decoder.

Within the LAN 100, the STB 114 can be connected though a digital network to a network device 122 the records or plays back a television program. Thus, the STB 114 can stream the television program through the network to the network device, where the program will be processed (e.g., played back or recorded). For example, in one implementation, the network device 122 can be another settop box connected to a display device that receives the television program and plays back the program on a display device. In another implementation, the network device can be a network storage server that includes a permanent storage medium (e.g., hard disk storage or an optical disk storage) 124 for storing television programs received at the LAN 100 from the cable connection 102, the satellite connection 104, or the Internet connection 106, so that the stored programs can be played back on a display device 120 sometime after the programs were received. The STB 114 can be connected to the network storage server 102 via a wired network connection 130 or a wireless network connection 132. The wired network connection 130 can be an Ethernet network through which the STB 114 can communicate with the network storage server 122, and the wireless network connection 132 can be an 802.11 wireless network through which a STB 114 can communicate with the network storage server 122. The LAN 100 can exist, for example, within the home of a subscriber of various television programs. Thus, in some implementations, the subscriber may have multiple display devices 120 positioned in different locations within the home, and the display devices can be connected to different STBs 114. In one implementation, the STB 114 in the subscriber's home can be connected to a single network storage server 122 that can be used to store television program for later playback. In such an implementation, each STB 114 connected to the storage server need not include a permanent storage device for storing television programs. Rather, this "edge device" can be equipped with circuitry for decoding television programs signals for playback on the display device 120, where the television program is received either from outside the LAN 100 (e.g., from the cable connection 102, the satellite connection 104, or the Internet connection 106) or from the network storage server connected to the LAN, but can be built more economically than a STB that must include a local permanent storage device for storing programs for timeshifted playback.

When a television broadcast is received at the LAN 100, a television program in the broadcast can played back on the display device 120 while simultaneously storing the television program on a permanent storage device 124 connected to the network. A television broadcast can be received from the cable network 102, the satellite network 104, or the broadband network 106, and a television program within the broadcast can be stored on the storage device 124 while simultaneously rendering a program within the broadcast on a playback device 120 connected to the network. The display device 120 and the STB 114 locally connected to the display device can be diskless, such that recording of the television program must be stored on a networked storage device 124, such as the storage device on the network storage server 122. Then, a timeshifted version of the television program can be received at a STB 114 from the network storage server 122 for playback on the display device and played back on the display device 120.

Figure 2:
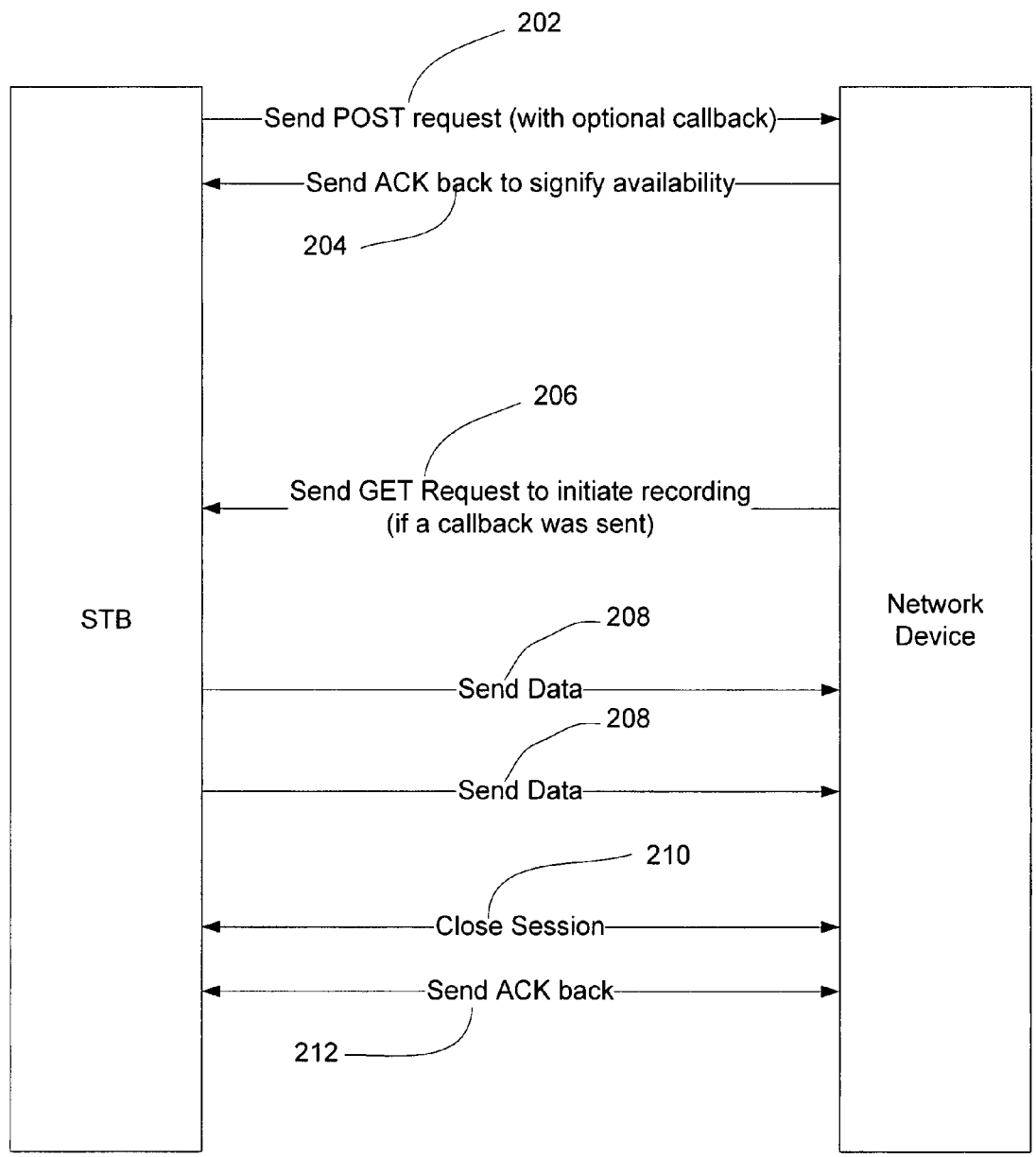
FIG. 2 is a flow chart of a method in which a session is established for recording a television program from a settop box to the permanent storage device of the network storage server over a network.

FIG. 2 is a flow chart of an exemplary method in which a network session can be established the STB 114 and the network device 122, such that a television program can be streamed according to a network protocol from the STB 114 to the network device 122 for playback or recording at the network device. For example, a user of the STB 114 (e.g., subscriber of the television broadcast received over the connection 102, 104, or 106) can program the STB 114 to record a user-specified television program from the television broadcast to a network-connected storage server 124. In one implementation, the STB 114 that initiates the recording can send a message with a callback uniform resource locator (URL) or uniform resource identifier (URI) to the network storage server 122, so that the storage server 122 can pull the television program from the STB for recording.

The control of the recording can be performed by a passive control flow socket via an HTTP connection using a TCP/IP protocol between the STB 114 and the network storage server 122 with a simple initial message from the STB 114 and a response from the storage server 122. The record session can be closed by closing the TCP/IP connection between the STB 114 and the storage server 122. Either the STB 114 or the network storage server 122 can close the session, and the closure of the session can include closure of the passive flow control socket by a close socket connection message to the network storage server 122 by the STB 114.

As shown in FIG. 2, the record process on the network storage server 122 can be started with a trigger from the STB 114, and this can be implemented with a HTTP server process attached to a local TCP Port-number. Thus, a recording session can be initiated by the STB 114 issuing a POST command to the network storage server 122 (step 202), and an acknowledgment response from the network storage server (step 204). When the POST command is issued in step 202 a callback request can optionally be sent from the STB to the server. If a callback request is sent, then the server sends an HTTP GET request to the STB to initiate the recording (step 206).

The STB 114 uses information about the IP-address/name of the network storage server 122, the server TCP port number, the availability of this network record service, and how to access it to stream data to the storage device 122. With each recording session the following information can be specified to the storage server 122: the video filename of the television program being recorded; the video type, which can be defaulted to Moving Picture Experts Group (MPEG) type, but which can also be another video type, such as, packetized elementary stream (PES), Advanced Video Coding (AVC); the program clock reference, (PCR) program ID (PID), or Video PID, so that the server 122 can create an index file of video frames of the stored television program, so that the stored program can be played back with proper timing. Other information can also be provided, such as, for example, an audio PID, and audio type, the duration of the program, etc. If more than one television program is being recorded from the television broadcast, then multiple PID can be specified to the network storage server. Additionally, a callback uniform resource identifier (URI) can be provided with the POST request to the network storage server 122, so that the server can pull record data from the STB 114, over an IP protocol.

Messaging between the STB 114, and the storage server 122 can be performed using HTTP header options, which specify recording parameters and provide a simple way to parse and understand parameters passed by STB 114 to the server 122. An example HTTP header for a record request, with a hypothetical schema identified by the tag "Network-AV-Record.schemas.broadcom.com," is shown below in Table 1.

TABLE 1

HTTP Header for Record Request:
POST /record-url HTTP/1.1
Content-Type: text/html
Network-AV-Record.schemas.broadcom.com: File-Name: Jurassic-Park.mpg
Network-AV-Record.schemas.broadcom.com: Event-Start: Sat, 01 Jan 2006 00:05:30 GMT
Network-AV-Record.schemas.broadcom.com: Event-Duration = 1:30:00.000
Network-AV-Record.schemas.broadcom.com: Connection = keep-alive
Network-AV-Record.schemas.broadcom.com: Event-URL = http://192.168.1.101:5000/record0
Network-AV-Record.schemas.broadcom.com: Event-Type = Live-Event
Network-AV-Record.schemas.broadcom.com: Video-Type: Mpeg2-TS
Network-AV-Record.schemas.broadcom.com: Audio-Type: 0x81
Network-AV-Record.schemas.broadcom.com: Audio-PID: 0x34
Network-AV-Record.schemas.broadcom.com: Video-PID: 0x31
Network-AV-Record.schemas.broadcom.com: PCR-PID: 0x31
Network-AV-Record.schemas.broadcom.com: Encryption-Type: 3DES
Network-AV-Record.schemas.broadcom.com: Client-ID: xxxx-xxxx-xxxx-xxxx-xxxx-xxxx
Network-AV-Record.schemas.broadcom.com: Version: 1.0.1

The first line in the HTTP header identifies the record-URL, which can be advertised by the network storage server 122 to the STB, and also identifies the HTTP protocol version. Different record-URL's may be advertised by an individual network storage server 122, depending on various policy-based constraints on content streamed to the server. The "Content-Type" line indicates the media type of the data sent to from the STB to the network storage server 122.

The "File-Name" is the suggested filename of the file for storing the television program stored on the server 122. The "Event-Start" field instructs the network storage server 122 to start the recording by connecting to the STB 114 at the specified universal time, but if the recording is required immediately, this field may be omitted. The "Event-Duration" field instructs the server 122 to record up to and no more than the specified number of hours:minutes:seconds.milliseconds from the Event Start time, and provides a mechanism to limit duration on the recording on the storage device 124 of the storage server 122.

The "Event-URL" is the callback URL for the server 122 to connect to the STB 114 to receive the binary data related to the video recording requested. It is the STB's responsibility to start the content immediately after the response from the server is received. The URL usually specifies an HTTP protocol. However, other formats are possible, such as Real-time Transport Protocol (RTP) and User Datagram Protocol (UDP), so that other URL formats would be usable. The event URL is optional, and recording may immediately commence by clients sending the data directly to the server's record URL.

The "Event-Type" field can be used to identify if the recording is a live event, a real-time event, or a pre-recording that is available locally on a disk of the STB. This allows the network storage server 122 to prioritize the STB, so that minimal loss of packets will result for recordings that are most sensitive to packet loss. Also, this field can provide information about average bit-rate to be expected during the recording session.

The "Video-Type" field specifies the type of digital video transmitted from the STB 114 to the network server. The video type could be MPEC, PES, AVC, etc. This field allows the network storage server 122 to create a file about the particular video type in the binary record stream. When a STB 114 wants to playback the recorded television program this field allows the server 122 to hint the STB 114 to use the specific video type. Similarly, the "Audio-Type" field specifies the audio type and allows the server to create a file about the particular audio content in the binary record stream and to hint a STB 114 that wants to playback this content to use the specific audio type.

The "Audio-PID" field identifies the audio program associated with the television program that is to be recorded. One or more audio programs may be present in the recording, and a secondary audio PID, or various languages, etc. can be specified with this field. The Audio-PID field allows the network server 122 to hint a STB 114 that wants to playback this content to use the audio program associated with the specific audio PID. Similarly, the "Video-PID" field identifies the video program and is used by the network server 122 to create a file about the particular video content in the binary record stream, which allows the server 122 to hint a STB that wants to playback this content to use the video content specified by the specific video PID.

The "PCR-PID" field is used for an mpeg transport stream and specifies the program clock reference. It is used for software indexing of transport streams at the network server 122. An "Encryption-Type" value can be send from the STB 114 to the network storage server 122, and designation codes such as "encrypt at client," "encrypt at server," "decrypt at client," "decrypt at server," and encryption algorithms such as 3DES, AES, etc. can be designated with this field.

The "Client-ID" field can be used for the network storage server 122 to keep track of clients. Optionally, a unique client ID could be negotiated by the STB with the server, or an industry standard Universally Unique Identifier (UUID) or Globally Unique Identifier (GUID) could be used. In one implementation, a server-assigned cookie identifying the STB or a user ID could be assigned to keep track of a client. If the STB device 114 is simultaneously recording more than one recording to the network storage server 122, a session ID and separate callbacks (i.e., event-URL's for the server 112 to identify independent record streams from different STB 114) can be provided to identify the different television programs being recorded. The "Version" field can be attached to the header fields to identify the schema version that is supported, which allows network storage servers 112 to operate with backward compatibility to older STB 114.

The HTTP protocol described above allows control of the recording by a third party. For example, a user may use a browser to create a simple HTML form with the above described fields, and the form can be forwarded to a STB 114 and the network storage server 122 to initiate a recording transaction from the STB to the server 122. The protocol described here is therefore capable of a three-party model, with the server, the STB, and a control station being independent of each other, which allows flexibility in administering the recording transactions. Alternatively, more elaborate extensible markup language (XML)-based schemas can be developed to address the needs of network recordings. By using the HTTP protocol and associated parameters to describe the recording any guesswork that must be done at record time or playback time, in auto-detecting content types, which is often a costly CPU and costly resource operation, can be minimized or eliminated.

When a recording of a television program needs to be started, it can be initiated by a timer event or a remote control event, or other user event on STB-side of the network. Then, a TCP socket can be created, and an appropriate HTTP POST message can be sent from the STB to the server 122, with the required parameters (e.g., the filename, PCR-PID, and callback URL) any of the optional parameters described above. When recording a live television program, the recording must start shortly after a positive acknowledgement (step 204 in FIG. 2) is received from the server 122 to STB 114. Then, the television program to be recorded is sent from the STB 114 to the server 122 (step 208). The recording session is terminated when either the STB 114 or the server 122 closes the control socket (step 210) and an acknowledgment is sent back from the server 122 or the STB 114, (step 212) or when the content duration expires on server-side of the network.

When a network session is established between the STB 114 and the network device 122, a television program can be streamed with high efficiency from the STB 114 to the network device using techniques described in more detail below. While streaming the television program, the STB 114 can simultaneously playback the television program to an attached display device 120. This feature provides digital video recorder (DVR) like capabilities to low-powered end-stations using network attached storage. Because the live program (received via Cable, Satellite, Off-air Broadcoast, Analog or even Internet Video received via DSL/Cable Modem) cannot be buffered to a hard disk if the STB 114 does not include local disk capability, the same buffers that are used in decoding/de-multiplexing the television program from the television broadcast received at the STB 114 can be used while rendering the television program on the attached display device 120 and can provide a just in time streaming (JITS) mechanism for streaming the program to the network device 122 that is both error free and efficient with respect to CPU usage.

Figure 3:
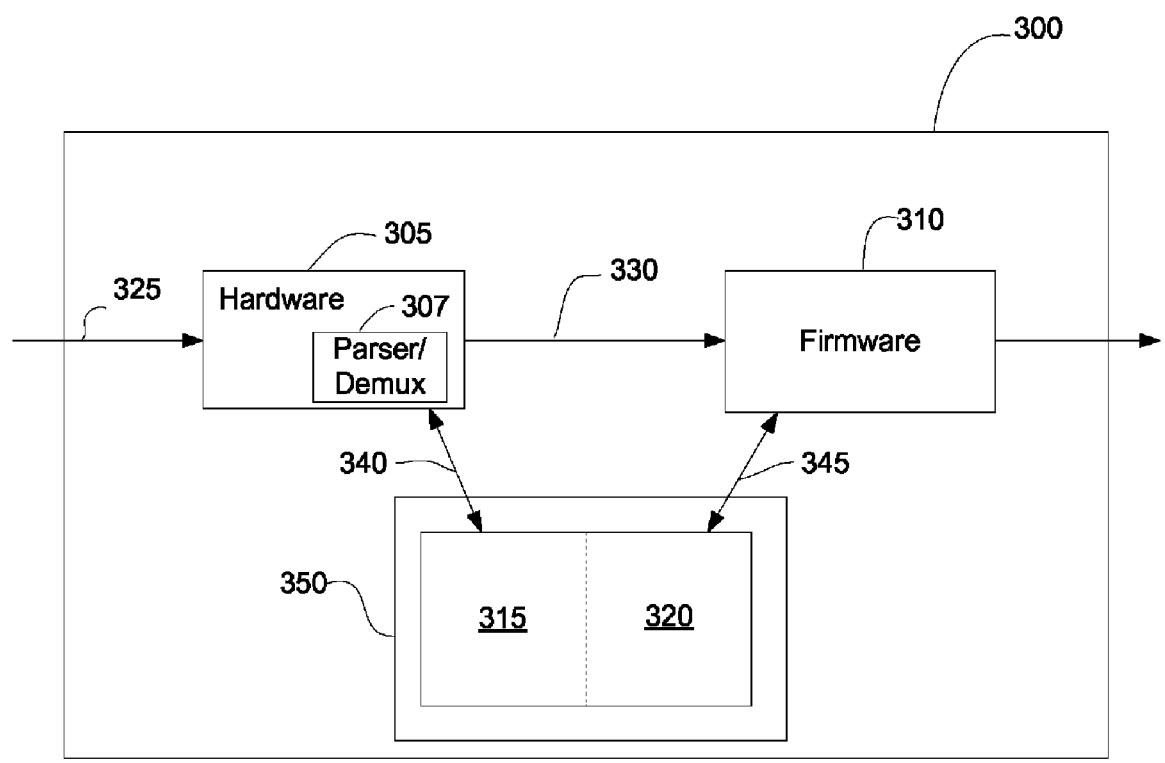
FIG. 3 is a schematic diagram of a record audio video engine (RAVE).

FIG. 3 is a schematic diagram of a record audio video engine (RAVE) 300, which is described in further detail in U.S. patent application Ser. No. 11/348,563, filed on Feb. 7, 2006, and in U.S. patent application Ser. No. 11/345,468, filed on Mar. 21, 2006, both of which are incorporated herein by reference. The RAVE 300 can be used by the STB 114 to handle incoming television broadcasts, demultiplex a television program from the broadcast, and temporarily buffer packets of the program. The RAVE 300 may include a hardware assist block 305, a firmware block 310, and a memory block 350 and can receive input data 325 (e.g., a television broadcast received from connection 102, 104, or 106). The input data 325 can included packets of video, audio, and record data in any number of formats. After receiving the input data 325, the hardware assist block 305 can perform some processes and pass processed data to a firmware block 310, either directly via data path 330 or indirectly via the buffer block 350. The processed data may be passed from the hardware assist block 305 via data path 340 to the memory block 350, which may then be accessed by the firmware block 310 via data path 345.

The hardware assist 305 block can include, for example, a parser/demultiplexer 307 that acts to de-multiplex data streams corresponding to individual television programs that are part of the television broadcast received from a connection 102, 104, or 106 and that my perform parsing of formatted incoming packets (e.g., MPEG packets). The hardware assist block generally performs functions that are relatively unlikely to change such as, for example, MPEG parsing, and demltiplexing, and the firmware block 310 may make most or all of the final decisions of the RAVE 300. Functions that may change as a result of, for example, a new data format may be processed mainly by the firmware 310 with some processing that may be done by the hardware assist 305.

When a data stream of sequentially received packets, which includes, for example, packets A, B, and C, is received by the RAVE 300, a current packet, packet A, may come into the RAVE 300 via input 325. The hardware assist 305 may perform a portion of the functions associated with the processing of packet A, and may retrieve information associated with packet A as well. The hardware assist 305 then writes retrieved information (e.g., the data payload of a received packet) to a location in the memory block 350 such as, for example, a first buffer 315.

After the hardware assist 305 performs the portion of the functions associated with the first packet A, the firmware 310 may access and begin processing the data associated with the first packet A from the buffer 315 and may output the processed data. Meanwhile, while the firmware 310 is processing the previously received first packet A, the hardware assist block 305 may process the next packet (i.e., packet B) and write the associated retrieved data in another location in the memory block 350 such as, for example, a buffer 320. The firmware 310 may then begin processing the packet B from the buffer 320, and the hardware assist 305 may process the next packet (i.e., packet C). The hardware assist 305 can write the associated information into the buffer 315, overwriting the data associated with the packet A previously processed by the firmware 310, if permission is granted to overwrite the previous data.

Figure 4:
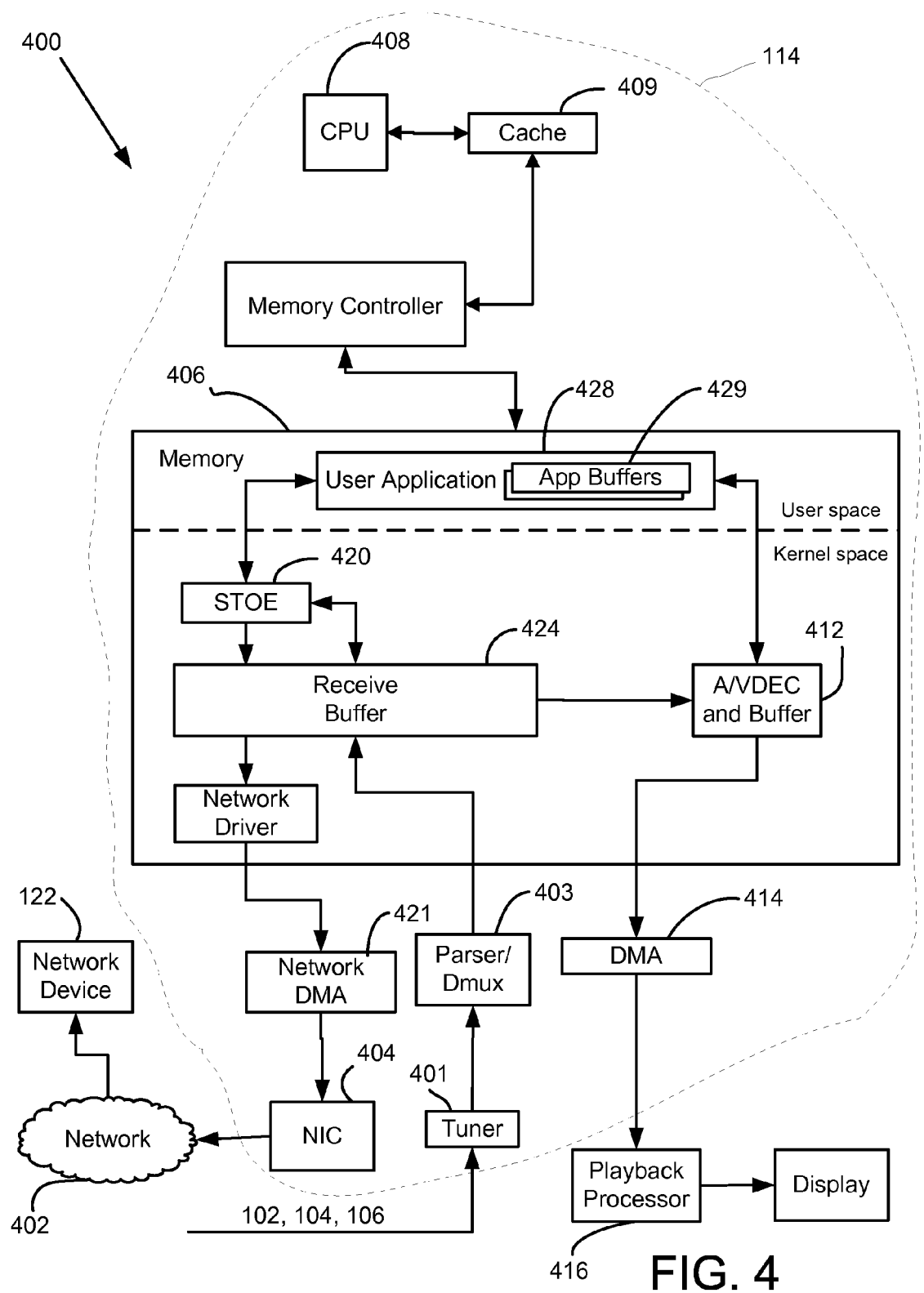
FIG. 4 is a schematic diagram of a settop box adapted for streaming digital television programs over a network, for example, by a software based TCP/IP offload engine for making fast and error-free transmissions of data.

FIG. 4 is a schematic diagram of a system 400, which includes a STB 114, for the reception and playback delivery and playback of digital media data. Certain exemplary structures are shown in FIG. 4 as being part of one particular implementation of the STB 114. For example, a central processing unit (CPU) 408 is operatively coupled to a local cache 409 that is generally a smaller, faster memory device that the main memory 406 and that can store copies of the data fetched from the main memory 406. The CPU 408 can perform operations on the cached data and then, once the operations have been performed, the data in the main memory 406 can be updated to be consistent with the new data in the cache 409. The STB 114 also includes a non-volatile memory 412 suitable for embodying computer program instructions and data that are executed and/or processed by the processor 408. The memory 412 can be one or more of, for example, a semiconductor memory device, e.g., EPROM, EEPROM, and flash memory devices; magnetic disks, e.g., internal hard disks or removable disks.

As shown in FIG. 4, a television broadcast can be received over a connection 102, 104, or 106, and a program can be selected from the broadcast with a tuner 401. A parser/demultiplexer 403, which can be part of the hardware assist block 305 of the RAVE 300, can demultiplex the desired program from the broadcast and can parse the packets of the television program and load the payload data of the desired program into a buffer 424, which can be a buffer 315 or 320 of the RAVE 300. The payload data can be routed directly from the kernel space receive buffer 424 to a media decoder 412 (e.g., an audio decoder or a video decoder). After receiving the data, the decoder 412 can decode the data and route the decoded data though a direct memory access ("DMA") circuitry 414 to a playback processor 416 for display on a locally connected display device 120.

As shown in FIG. 4, packets of television program data can be streamed to the network device 122 (e.g., a storage server) from the STB 114 over a network connection 402 through a network interface 404 (e.g., a network interface controller (NIC)). To efficiently stream the television program out of the STB 114 over a network 402 to a network device 122, packets can be intercepted as they are admitted to the receive buffer 424 of the RAVE 300 and streamed out in synchronization with their arrival in the STB 114.

When the packets of the television program are streamed from the STB 114 to the network device 122 according to a TCP/IP network protocol, the TCP/IP processing can be offloaded from the CPU 408 of the STB 114 to a software-based TCP/IP offload engine (STOE) 420 that eliminates the need to copy payload data from the kernel-space buffer 424 to a user-space application buffer 429 in a user application 428. When running the software-based TCP/IP offload engine, TCP/IP packets can be received from a STB 114 via the network connection 130 or 132, stripped of their header information, and then the data payload can be routed directly from a kernel space receive buffer 324 through a memory-to-memory direct memory access ("DMA") circuitry 334 without being passed up through a traditional TCP/IP stack and copied into user space application buffers 329.

Figure 5:
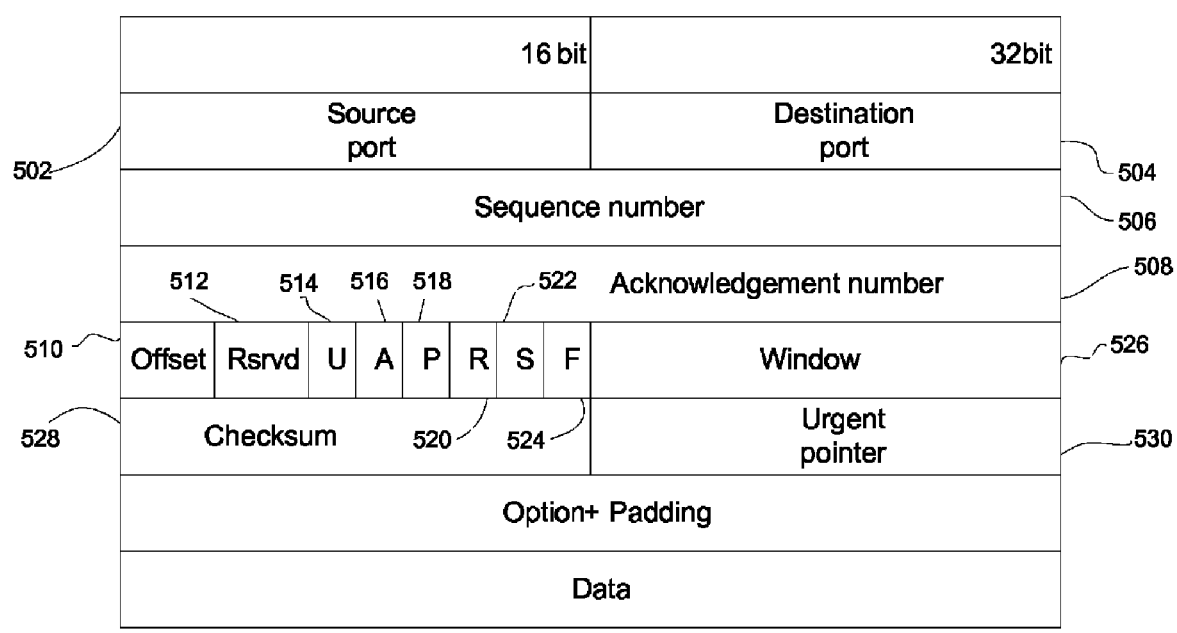
FIG. 5 is a block diagram of a TCP header template.

Several modifications to the traditional TCP/IP protocol can be made to provide a simple STOE that can efficiently process the data traffic that is streamed from the STB 114 (i.e., the server) to the network device 122 (i.e., the client). FIG. 5 shows the fields of a TCP packet 500, and the role of these fields in the STOE is described below. The source port field 502 indicates the address of the port from which the packet originated and can be used in the STOE 420 for packet filtering. The destination port field 504 indicates the destination port or MAC address to which the packet is transmitted and also can be used for packet filtering.

During normal operation after a TCP/IP session has been established between the client and the server, the sequence number ("SEQ") field 506 contains the sequence number of the first data octet in this segment. However, when a synchronize ("SYN") packet is present to initiate a new connection and synchronize the sequence numbers between the STB 114 and the network device 122, the sequence number field 506 contains the initial sequence number ("ISN"), which can be a randomly selected number. Then, the value of the first data octet is ISN+1. When the server operates with the STOE 420 to stream data from the STB 114 to the client, the value of the sequence number field 506 is the byte offset in the stream plus the initial sequence number. Thus, the value of the sequence number field 506 identifies a packet, and if a client sends a message that it did not receive a particular packet and requests retransmission, then the packet can be retransmitted from the server based on the requested sequence number.

If the ACK control bit is set, the acknowledgement number field 508 contains the value of the next sequence number that the sender of the segment is expecting to receive. Once a connection is established, this value is always sent. In the STOE operation, for packets transmitted from the STB 114 to the network device 122 this number is constant. For packets received from the client, the value of the ACK number field provides information about which packet has been received by the client. The data offset field 510 contains the number of 32-bit words in the TCP header, which indicates where the data begins. The TCP header (even one that includes options) generally has a length that is an integral number of 32 bits. When using the STOE 420, the value of the offset field value can bet set to a constant value (e.g., 8, which gives a 32 byte TCP Header). The reserved field 512 is reserved for future use and is set to zero.

Various control bits can be set. For example, a valid urgent control bit 514 can indicate that an urgent pointer field is significant, but this bit is not used when operating the STOE 420. A valid acknowledgement control bit 516 indicates that an acknowledgement field is significant, and this field is always valid when operating the STOE 420. A valid push control bit 518 indicates that the session is operating in push mode, but this bit is not used when operating the STOE. A valid reset ("RST") control bit 520 indicates that the TCP/IP connection must be reset and is used by the STOE to terminate a session between the client and server. A valid synchronize ("SYN") bit 522 is used to indicate that sequence numbers of packets must be synchronized between the server and the client and is always set to be valid when operating the STOE 420. A valid finish ("FIN") control bit 524 indicates that no more data is to be sent from the sender. Thus, the STOE uses only the acknowledgement bit 516, the synchronize bit 522, the reset bit 520, and the finish bit 524, while other control bits of the TCP header are ignored. A value of the window field 526 can be set to a constant value.

The checksum field 528 is the 16 bit one's complement of the one's complement sum of all 16-bit words in the header and text of a packet. Packets received at the network device 122 need not be check-summed because of the Ethernet cyclic redundancy check ("CRC") validity that is performed at the Ethernet datalink layer.

The urgent pointer field 530 communicates the current value of the urgent pointer as a positive offset from the sequence number in this segment. The urgent pointer points to the sequence number of the octet following the urgent data. This field can only be interpreted in segments for which the urgent control bit 514 has been set, and therefore is unused in the STOE. The options field 532 may be transmitted at the end of the TCP header and always has a length that is a multiple of 8 bits. The data field contains the digital media compressed payload that is to be recorded at the network storage server 122.

The processing of a synchronization ("SYN") packet is used to handle connection establishment. The network device 122 sends an initial SYN packet to the STB 114, and the initial SYN packet needs to be acknowledged by adding+1 to the sequence number of the received packet. Thus, an ACK packet having an acknowledgement number equal to the sequence number of the received SYN packet+1 is created within the STB 114 and sent back to the network device 122 as the acknowledgement packet. In addition, the STB 114 can pick a random 32-bit unsigned integer as its initial sequence number. This initial sequence number is used to make up the initial SYN–ACK packet. The SYN–ACK can be a 66 byte packet with only the header fields.

After receiving the server's SYN+ACK packet from the STB 114, the network device 122 sends an ACK packet again, which constitutes the three-way handshake to establish the connection, and the connected system call succeeds. Then, the STB 114 is ready to send data to the network device 122, and it also has pre-stored a transmission header template to use when communicating with the client.

A packet received from the network device 122 (e.g., a SYN packet) by the STB 114 can be used to generate a template header for sending out packets from the STB. The template header can based on the Ethernet, TCP, and IP headers of the received packet and information in these headers from the received packet can be largely reused when streaming data from the STB 114 to the network device 122. If the connection state does not change, the STB-side TCP header only needs to change the value of the sequence number field when a new SEQ packet is sent out or the STB-side TCP header only needs to change the value of the acknowledgement number field when a new ACK packet is sent out. Therefore, a reusable header template containing static values used in the TCP/IP header that do no change during a session can be generated based on the initial SYN/SYN–ACK/ACK handshake that is used to establish the server-client connection, and this header template can be stored in memory 406 for later reuse when preparing packets for streaming from the server to the client.

Fields of the TCP header that change during data transmission include a checksum field and a sequence number ("SEQ") field. The value of the SEQ field is incremented for successive packets, and an initial checksum value can be calculated based on the values of fields in the TCP header that do not change. The checksum calculation also must be re-computed each time a new packet is received.

Once the connection between the STB 114 and the network device 122 is established, the STOE 420 automatically takes over the communications with the client and transmits the streaming data directly to NIC 404 to send out over the network 402 to the client. The network device 122 of the STOE 420 is assumed to be a standard TCP/IP client that need not receive any indication that it is communicating with the STOE 420. Therefore, the STOE is completely inter-operable with any type of TCP/IP capable client device that accepts streaming data over TCP/IP.

After the server-client connection is established and the server 420 begins sending out data packets to the client, the static value in the Ethernet, IP, and TCP template headers can be used as the headers of the packets that are sent out from the server to the client. Only the values of the TCP header's SEQ field and the value of the checksum field need to be updated and inserted into the variable fields of the template header used for outbound packets. Thus, a packet header template containing the static values of the header can be stored in the memory 406, and the CPU 406 only needs update the variable values of the header template (e.g., the value of the acknowledgement number field and/or the sequence number field) before pre-pending the header template to a payload data to form a packet and then sending out the packet. Therefore, the CPU 408 only needs to writeback (or export) data that pertains to the variable values in the header template from its cache 409 to the header template in main memory 406. Because the relatively little data needs to be written back from the cache to the main memory CPU and memory resources are conserved and the STOE can operate quite efficiently.

After a packet has been prepared with the appropriate header (i.e., containing the static fields and the variable fields, as defined by the CPU 408), the STOE 420 can instruct the Network DMA 421 to copy the data payload from the receive buffer 424 and the prepared template header, which together comprise a packet, and to send the packet to the network device 122. Then the information pertaining to variable portions of the header is flushed from a CPU-cache, and the packet is sent out via the transmit hardware. Finally, the packet is sent out over the Ethernet hardware.

After the server-client connection is established, the STB 114 sends data to the network device 122. Within the STB 114, the number of the packet that has last been acknowledged by the client is compared with the sequence number of the packet that is ready to be sent out from the STB 114. If the client's acknowledgement is not for the current packet, then the server must retransmit a packet that it previously attempted to send. For example, if the ACK packet from the client is not received for one receiver window length before the current sequence number, the transmission can be stalled for a certain time period (e.g., 20-40 ms), and then retransmission can occur from the point of the missing packet. Alternatively, the server can wait to receive three duplicate ACK packets from the client, and then begin retransmitting from the missing point, whichever occurs first.

Reception of packets at the network device 122 can be handled in the standard manner by the client TCP/IP stack, and the network device 122 need not be aware that it is in communication with the STOE 420.

The STOE 420 keeps track of the next sequence to transmit. If the acknowledgement for a packet that is sent out is not received within one window size from the current sequence number, the packet for which the sequence number is missing can be retransmitted, after a timeout period. The length of the timeout period can be adjusted depending on the bandwidth requirement of the media file being transmitted. Usually a 20 ms timeout period is sufficient and not too aggressive and has the effect of providing an extremely fast, proactive server-side retransmission of missing packets. Thus, the STOE 420 can transmit one packet every 1 ms until acknowledgements are received and the network device has caught up. The network device 122 may also request fast retransmission by sending three duplicate ACK packets for the previous packet to indicate that the STB 114 should back up to the missing data packet and start retransmitting from the missing packet.

The STOE 420 is an optional feature when other network protocols that do not require per-packet changes to the network header of the streamed packets are used. For example, UDP/IP is used to stream video data, particularly when performing a multicast streaming to a plurality of different receiving devices, and in such a configuration the STOE 420 need not be used.

Still referring to FIG. 4, the receive buffer 424 of the RAVE 300 can be a ring buffer, and if Ethernet packets of payload data are loaded into the buffer 424 at a rate of about 20 MBits per second and the buffer has a size of about 2 MB, then the buffer may be filled in a fraction of a second. Thus, payload data is streamed out of the buffer 424 to the network device quickly, before the buffer wraps around and overwrites data that had previously been written to the buffer. A write pointer can be maintained by the RAVE 300 to point to the address within the buffer 424 of the most recently written Ethernet packet that is written to the buffer. A streaming pointer can be maintained that points to an address in the buffer 424 that is one packet behind the write pointer, and that points to payload data of the current Ethernet packet that is to be streamed out of the buffer to the network device 122. The payload data that is pointed to by the stream pointer can be copied out of the buffer, packetized, and relayed over the network 402 to the network device 122. A read pointer also can be maintained by the RAVE 300 to point to the address in the buffer 424 from which the packet that was most recently acknowledged as successfully received by the network device 122 was sent. Packets that have been acknowledged as successfully received can be overwritten in the buffer 424. Because packets are streamed to the network device essentially as payload data arrives in the buffer 424 (i.e., within the arrival time of about one or just a few packets), a time index of the packets in the television program need not be created and maintained, since the time-ordering of the streamed packets can be based on the same time-ordering of the packets as they are received in the buffer 424. This can be done because the packets of the television program that are received over the connection 102, 104, or 106 are received from a high-quality, low-latency streamer. Thus, by efficiently and quickly streaming payload data out of the buffer 424 to the network device 122 just as the payload data arrives in the buffer 424, the clock of the high-quality, low-latency streamer can be used to time-order the packets streamed to the network device 122. Although RAVE buffer 424 is described here as a ring buffer, alternatives are also possible. For example, if the STB 114 does not include a RAVE 300 that has its own hardware buffer, then a purely software implementation of the buffer can be used to buffer the incoming data.

To stream payload data out of the buffer 424, an ultra direct memory access (UDMA) engine 421 can assemble packets from multiple discontiguous sections of memory and route the packets out over the NIC 404 as the RAVE 300 is receiving payload data in the next packet of the television program. The UDMA engine 421 of the NIC 404 can perform a scatter/gather process into a DMA queue without requiring that the payload data be copied to application buffers in user space, which reduces CPU processing in the STB 114.

Figure 6:
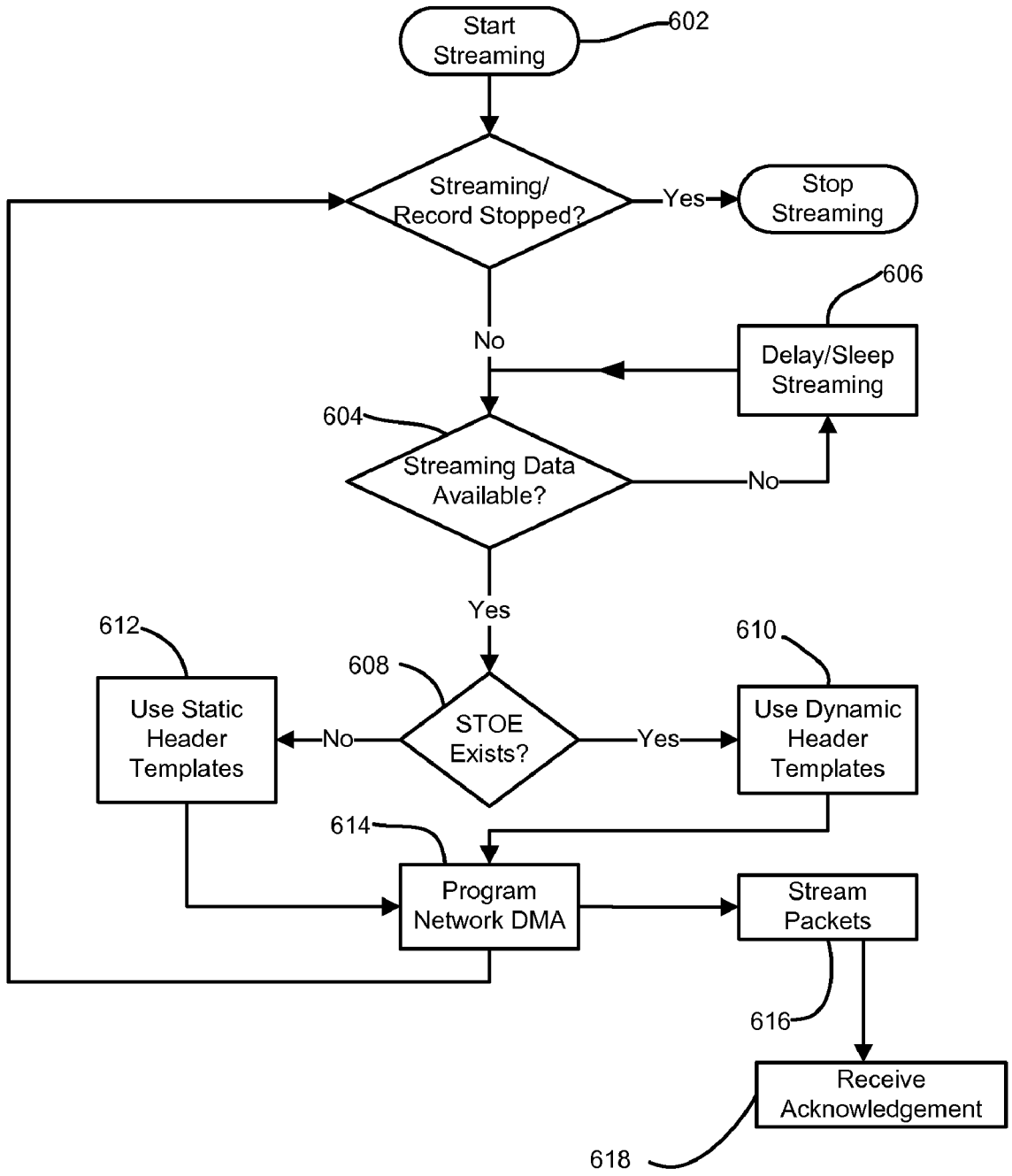
FIG. 6 is a flow chart of a process or streaming digital media data.

FIG. 6 is a flowchart illustrating an example process that can be performed with the systems described above to stream a television program from the STB 114 to the network device 122. The process begins with a request to start streaming (e.g., to perform a recoding over the network 402) (step 602). Next, it is checked whether data to be streamed has arrived or is available in the buffer 424 (step 604). This check can be performed, for example, by checking the value of the write pointer used in the RAVE 300, which can acquire a non-default value once data is available in the buffer. Starting streaming process before actual physical data arrives in the buffer allows capture of all the payload data of the streamed television program, including the first few packets.

If there is no data to be streamed out, the streaming process may sleep or wait for the next polling interval (step 606). It is possible to run the polling interval at a few milliseconds interval that is tracked by a kernel timer, which means that it is not necessary to account for exact timing for streaming and programmable clock reference (PCR) pacing. The incoming stream of packets that comprise the television program is assumed to have low jitter and is assumed to have been streamed by a high-quality streamer at the headend, which is generally true for Satellite and Cable digital TV streams.

Many network protocols can be employed in the streaming of audiovisual data for a television program. Usually an audiovisual packet size smaller than the Ethernet frame size (about 1500 bytes) is used, which allows up to seven MPEG packets (i.e., 188×7 bytes because 188 bytes is the MPEG transport packet size) to be packaged into one network packet. Some network protocols allow the same header to be used for all packets that are sent (e.g., the User Datagram Protocol (UDP) with no checksumming), while other protocols can have a varying degree of header modification from packet to packet. However, even when the with packet-dependent headers, only the header section of the packet need to be processed by the CPU, and the payload data need not be copied into and out of application-layer data buffers. As described above, with reference to the STOE, template header packets can be used in which only the fields that change from packet to packet, such as checksum, sequence number, etc., are modified, and the Ethernet cyclic redundancy check (CRC) can be relied up, so that checksumming is not necessary. At step 608, it can be checked whether the network protocol used to stream the packets will make use of a STOE. If so, then the headers are dynamically created for each packet streamed out of the STB 114 (step 610), and if not, then a single template header is used for each packet (step 612).

After a network session has been established, the network DMA is programmed (step 614) and packets are sent out over the network to the network device (step 616 and acknowledgement packets are received from the network device (step 618). The process of outputting a packet is a DMA operation by the NIC transmit DMA controller. The DMA controller can access the payload data in the RAVE memory buffer and the headers (e.g., created dynamically by the STOE) in the packet header buffer and can composes a packet to be sent out on the physical network. At every opportunity to send a packet out it must be noted if a retransmission of a previously sent packet is required, and this can be done by checking the status of the RAVE read pointer. Only when a positive acknowledgement of a previously sent packet is received, then the RAVE read pointer may be incremented. If retransmission of a previously sent packet is not required, the new outgoing packet can be sent. Acknowledgement packets can flow into and be processed by the STOE, which can then determine the next packet to be sent out. However, a given header always goes with a given section of payload, and there are no recomputations needed for handling retransmission of a packet if an acknowledgement is not received.

For the push model of streaming a television program to the network device 122 the RAVE hardware record engine can be used for streaming out packets just in time as described hereinabove. Protocols capable of multicasting the television program can be used to achieved this, so that the packets are relayed to large number of network devices. Thus, it is possible to simultaneously relay to a large number of downstream clients, for recording and display, the contents of the original digital stream. In the pull model, the STB 114 can act as a streamer, and as soon as packets are ready to be sent, they are streamed out onto the connection oriented TCP/IP connections made by the network device that initiates the pull. The use of TCP/IP for actual streaming of data is optional, and streaming data using UDP, RTP or other protocols is also possible. If the protocol of streaming is not capable of retransmission and accounting for lost packets, the recording may be corrupted, however, use of TCP/IP with network error recovery can be utilized to perform reliable network recordings. To perform TCP/IP streaming efficiently, without much CPU usage, the STOE can be used at the STB 114.

In one implementation, the STB 114 can encrypt the streamed data while it is sent to the network device 122. For example, the hardware RAVE 300 engines can be used to encrypt the streamed data using a triple data encryption standard (TDES) algorithm before the data is streamed out to the network device 122. However, this is optional.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, modifications, substitutions, and changes can be made.

What is claimed is:

1. A method comprising:
   receiving a television broadcast at a first settop box, wherein the television broadcast comprises at least one program;
   establishing a connection between the first settop box and a network device for a session according to a network protocol;
   receiving time-ordered digital media data packets encoding the at least one program into a buffer;
   defining a packet header template having a plurality of static fields filled with static values valid for all packets sent from the first settop box to the network device during a relaying session and variable fields that can acquire packet-dependent values for different packets sent during the session;
   storing the packet header template and the static values in a memory;
   creating a packet header based on the header template by defining, in a central processing unit, at least one value of a variable field and by reusing the static values from the memory for the static fields;
   adding the network header to the digital media data packets, wherein adding the network header to the digital media data packets includes pre-pending the packet header created based on the header template to payload data from the buffer to form the packets to be relayed to the network device;
   relaying the digital media data packets to a network device connected to the first settop box through a network, wherein the packets are relayed substantially without latency and with a time-ordering based on the same time-ordering of the packets in the buffer;
   receiving acknowledgment packets from the network device acknowledging the reception of the relayed digital media data packets; and
   in response to the receiving acknowledgement packets, freeing space in the buffer that was used to buffer for the acknowledged data packets.

2. The method of claim 1, wherein the digital media data packets are non-network-aware data packets.

3. The method of claim 1, further comprising relaying the digital media data packets to a plurality of network devices connected to the first settop box through the network.

4. The method of claim 1, wherein the network comprises a wireless network.

5. The method of claim 1, wherein the protocol comprises TCP/IP and wherein a variable field of the header includes a value of a sequence number identifying the packet within a sequence of a plurality of packets sent during the session.

6. The method of claim 1, wherein the protocol comprises TCP/IP and wherein a variable field of the header includes a value of an acknowledgement number for the packet, the acknowledgement number corresponding to a value of a sequence number of the acknowledgement packet that the first settop box expects to receive from the network device in response to the sending of the packet to the network device.

7. The method of claim 1, wherein the protocol comprises TCP/IP and wherein the static fields include a source field, a destination field, and a window size field, wherein the variable fields include a checksum field, and the method further comprising performing a checksum analysis on the packet and adding the result of the checksum analysis to the checksum field.

8. The method of claim 1, wherein the protocol comprises TCP/IP and further comprising exporting from a cache the at least one value of a variable field defined by the central processing unit to a memory to associate the at least one value with the static values for the packet header.

9. The method of claim 1, wherein the variable fields include a sequence number field and an acknowledgement number field, and further comprising assigning sequence number values with a central processing unit to the sequence number fields of the header template for each of the plurality of packets.

10. The method of claim 1, wherein the first settop box and the network device are located within the same building.

11. The method of claim 1, further comprising:
    establishing connections between the first settop box and a plurality of network devices for sessions according to a network protocol; and
    relaying the digital media data packets via multicast streaming to the plurality of network devices according to the network protocol.

12. The method of claim 11, wherein the network protocol is UDP.

13. A settop box for streaming a television program to a network device through a network, the settop box comprising:
    a central processing unit;
    a network interface device;
    a direct memory access engine;
    a buffer; and
    a memory for storing computer-executable instructions for:
      causing the direct memory access engine to route time-ordered digital media data packets encoding the television program into the buffer;
      causing the central processing unit to define a network header template and store the network header template having static fields filled with static values valid for all packets sent during a session and variable fields that can acquire packet-dependent values for different packets of a plurality of data packets sent during the session;

causing the central processing unit to create a network header based on the header template by defining, in the central processing unit, at least one value of a variable field and by reusing static values from the memory for the static fields;

causing the central processing unit to add the network header to the digital media data packets by causing the central processing unit to pre-pend the network headers to the digital media data packets based on the network header template to payload data in the buffer to form packets to be relayed to the network device;

causing the network interface device to relay the digital media data packets to the network device through the network, wherein the packets are relayed substantially without latency and with a time-ordering based on the same time-ordering of the packets in the buffer; and causing space in the buffer used to buffer the digital media packets to be freed in response to receiving acknowledgment packets from the network device acknowledging reception of the digital media data packets.

14. The settop box of claim 13, wherein the digital media data packets are non-network-aware data packets.

15. The settop box of claim 13, wherein the network comprises a wireless network.

16. The settop box of claim 13, wherein
the variable fields include a sequence number field and an acknowledgement number, the memory further comprises computer executable instructions for;
causing the central processing unit to assign sequence number values to the sequence number fields of the header template for each of the plurality of packets.

17. The settop box of claim 13, wherein the settop box is a diskless settop box.

18. The settop box of claim 13, further comprising a RAVE.

19. The settop box of claim 13, wherein the settop box is located within the same building as the network device.

* * * * *

UNITED STATES PATENT AND TRADEMARK OFFICE
CERTIFICATE OF CORRECTION

| | |
|---|---|
| PATENT NO. | : 7,908,624 B2 |
| APPLICATION NO. | : 11/820102 |
| DATED | : March 15, 2011 |
| INVENTOR(S) | : Yasantha Nirmal Rajakarunanayake |

Page 1 of 1

It is certified that error appears in the above-identified patent and that said Letters Patent is hereby corrected as shown below:

In column 15, line 51, in claim 1, delete "the network" and insert -- a network --, therefor.

In column 15, line 57, in claim 1, delete "a network device" and insert -- the network device --, therefor.

In column 16, line 62-63, in claim 13, after "store" insert -- the network header template in memory, --.

Signed and Sealed this
Tenth Day of May, 2011

David J. Kappos
*Director of the United States Patent and Trademark Office*